July 5, 1966  G. O. WALTER  3,259,009
MECHANISM FOR PROVIDING A PRECISE REDUCTION
RATIO IN PHOTOGRAPHIC COPIERS
Filed Dec. 11, 1963
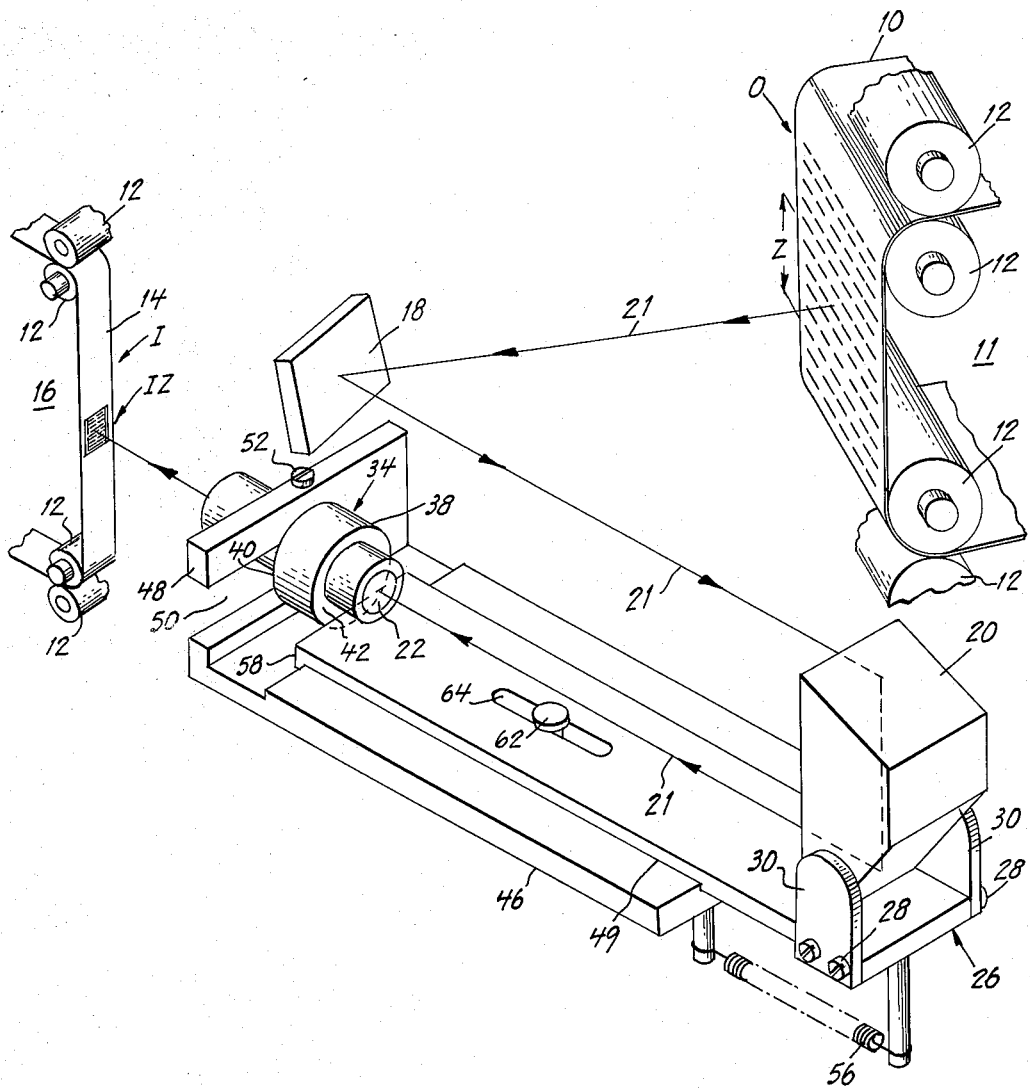
INVENTOR.
GERARD O. WALTER
BY
*G. J. De Angelis*
ATTORNEY

United States Patent Office 3,259,009
Patented July 5, 1966

3,259,009
MECHANISM FOR PROVIDING A PRECISE REDUCTION RATIO IN PHOTOGRAPHIC COPIERS
Gerard O. Walter, Westbury, N.Y., assignor to Sperry Rand Corporation, New York, N.Y., a corporation of Delaware
Filed Dec. 11, 1963, Ser. No. 329,821
4 Claims. (Cl. 88—24)

The invention relates to photographic copiers and more particularly to mechanism for providing a precise reduction ratio in photographic copiers of the "continuous" or "copy flow" type.

In photographic copiers of the "copy flow" type documents are photographed onto film sequentially while both the documents being photographed and the film are in motion, usually, in fixed respective document and image planes. The reduction ratio of the photographic copier, i.e., the ratio of document size to film image size, depends upon the actual focal length of the lens utilized in the copier and the object-to-lens distance. The latter distance is the length of the optical path from the surface of the document being copied to the lens. The actual or measured focal length of the lens normally differs from its nominal length within necessary manufacturing tolerances.

To obtain sharp reproduction or resolution in such copy flow type photographic copiers the film must travel in synchronism with the moving documents. The synchronized film velocity required equals the velocity at which the documents are travelling divided by the reduction ratio of the copier.

It is, therefore, desirable to obtain precisely the reduction ratio of the photographic copier to maintain exact image sizes and sharp and clear film images.

It is also desirable to obtain such precise reduction ratio and sharp resolution without the necessity of recalibrating the speed of film travel for each lens used.

It is, therefore, an object of the invention to provide an optical-mechanical arrangement for a photographic copier which provides a precise reduction ratio for the copier notwithstanding the existence of manufacturing tolerance variations in focal length of lenses used in such copier.

It is a further object to provide mechanism for automatically compensating for differences in the actual focal lengths of lenses interchanged in such copiers to maintain a desired precise reduction ratio.

It is still another object to provide for the interchangeable use of various lenses of the same nominal focal length in copy flow type copiers without necessitating resynchronizing the film and document speeds of travel.

The invention involves providing in a photographic copier an optical-mechanical arrangement which varies the lens-to-object optical distance between fixed image and object planes automatically compensating for deviations from nominal in the measured focal length of the copier lens.

In carrying out the invention, according to a preferred embodiment, a folded optical path is provided between the fixed image and object planes of the copier by interposing strategically placed light deflecting surfaces in the path. One of the deflecting surfaces, such as a prism, is carried by a mount which is spring biased against a shoulder provided on a lens holder. The prism is, thus, yieldably mounted with respect to the lens for movement along the optical axis of the lens.

With such an arrangement, since the distance between the fixed image and object planes of the copier is constant, the actual focal length of the lens determines the actual length of the optical path. The actual focal length of the lens is measured by known conventional procedures, and the position of the shoulder on the lens holder is calibrated to place the prism in a position with respect to the lens to provide a desired reduction ratio. The prism automatically moves to a position increasing or decreasing the optical path length between the object plane and the lens to provide the precise reduction ratio required. Lenses whose actual focal length variations from nominal have been previously measured and have been mounted in lens holders having appropriately calibrated shoulders may be interchanged in the copier with the subject spring biased arrangement. The prism position automatically adjusts the optical path length to maintain the precise reduction ratio notwithstanding that the lenses are of differing actual focal lengths.

Features and advantages of the invention will be seen from the above from the following description of operation when considered in conjunction with the drawing and from the appended claims.

In the drawing is shown a simplified schematic diagram in perspective of portions of a photographic copier which determine the reduction ratio of such copier, in accordance with the invention.

A document 10 in the form of a sheet is carried at a predetermined velocity by a document conveyor 11 past a photograph station Z. The conveyor may be of any convenient standard design, and for convenience is illustrated as two pairs of rollers 12. A light source (not shown) sequentially illuminates the portions of the document 10 passing past photograph station Z. The illuminated document portions are projected through known slit photography techniques onto a film strip 14 driven past an image zone IZ by a film transport 16, similar in construction to document conveyor 11. Photograph station Z lies in what may be termed an object plane O which is spaced apart from what is termed the image plane I in which the image zone IZ lies. Film strip 14 is driven past image zone IZ at a predetermined speed synchronized with the speed of travel of document 10. The direction of movement of film strip 14 and document 10 are shown by appropriate directional arrows.

It is to be understood that the arrangement shown is enclosed in a light proof housing with proper slit apertures (not shown) and lighting to enable photographing of the document 10 upon film strip 14; the housing, slit aperture and lighting all being of any standard conventional design and forming no part of this invention.

Means are provided to establish a folded optical path, indicated by end-to-end arrows 21, between the document surface at photograph station Z in object plane O and the film surface at image zone IZ in image plane I. Such means include a reflecting surface 18, such as a mirror, mounted to the copier framework (not shown) to interrupt the optical path of the document image, a prism 20 and lens 22. The document image at image plane O is reflected onto mirror surface 18 which is positioned to direct the image onto prism 20. Prism 20 again folds the optical path, directing the image through lens 22. Lens 22 projects the image onto the surface of film strip 14 at image zone IZ in the image plane I.

If desired, two mirrors (not shown), appropriately positioned, may be substituted for the prism 20 to provide a dual reflecting surface for folding the optical path of the copier, as does prism 20.

Prism 20 is mounted on a prism holder 26 by means of prism holding brackets 30 and fasteners 28. Prism holder 26 is in the form of a rectangular plate.

Lens 22 is secured in a lens holder 34. Lens holder 34 is of cylindrical configuration and is necked down at both ends to form an intermediate collar portion 38 having two concentric rear and front shoulders 40 and 42.

A horizontally disposed base plate 46 is provided for supporting lens holder 34 and prism holder 26. Base plate 46 has a lens holder, supporting bracket 48 protruding vertically from one end and a longitudinally extending groove 49 (for slidably receiving prism holder 26) defined along its longitudinal axis. A slot 50 is defined in bracket 48; the slot being dimensioned to receive lens holder 34 which is removably mounted therein with its rear shoulder 40 abutting the contiguous face of the bracket. A set screw 52 threaded through the upper portion of bracket 48 and against the external cylindrical surface of lens holder 34 holds the lens holder in place.

Prism holder 26 is slidably mounted in groove 49 of base plate 46. A spring 56, one end of which is attached to base plate 46 and the other end of which is attached, under tension, to prism holder 26, biases the prism holder to the left. This urges the left side edge 58 of prism holder 26 against front shoulder 42 of lens holder 34, movably fixing the position of prism 20 relative to lens 22. A flat headed stud 62 extends through a longitudinal slot 64 formed in prism holder 26 and is threaded into base plate 46. Stud 62 serves to retain prism holder 26 in groove 49 and in sliding engagement with base plate 46.

In operation, the document image is reflected by mirror 18 and prism 20 through lens 22 and onto film strip 14. It is desired that the document image photographed onto the film be a predetermined size relative to the size of the document being copied.

The reduction ratio of the photographic copier, i.e. the ratio of the dimension of the photograph zone Z to the dimension of the image zone IZ, is determined by the measured focal length of lens 22 and by the object-to-lens optical distance.

Although the distance between the object and image planes O and I, respectively, of the copier is fixed, the optical path distance may be varied by varying the position of prism 20 with respect to lens 22. The distance between prism 20 and lens 22 may be changed by increasing or decreasing the length of collar 38 formed in lens holder 34. This changes the point at which front shoulder 42 is formed along the optical axis of lens 22, and, in turn, increases or decreases the distance between yieldably mounted prism 20 and lens 22 along the optical path.

The lens-to-object distance of the copier equals the measured focal length of lens 22 multiplied by the desired reduction ratio. If the nominal focal length of the lens is 2 inches, and the path length of the copier is 40 inches, the nominal reduction ratio is 20. That is, the image size will be reduced onto the film strip 14 in the ratio of 20 to 1.

Assume that the lens 22 actually incorporated in such a copier has a measured focal length of 2.1 inches. This yields a measured reduction ratio of 40 over 2.1 which is approximately 19 instead of the desired 20. To obtain a reduction ratio of 20 the optical path length must be corrected to 20 times 2.1 or 42 inches. To lengthen the path by 2 inches, collar 38 of lens holder 34 is machined to position front shoulder 42 of lens holder 34 one inch further to the right along the optical axis of the lens. Since slidable prism holder 26 is spring biased against shoulder 42, as lens holder 34 is placed in the copier, prism 20 is automatically separated from lens 22 by one additional inch, making the total optical path longer by two inches to provide the necessary 42 inch path for the desired reduction ratio of 20. This is so, since the optical path from reflecting surface 18 to prism 20 is also increased by one inch.

It may be noted that, since for a one-tenth of an inch variation from nominal in the measured focal length of the lens an adjustment of one inch is indicated in the position of front shoulder 42, a workable reduction ratio may be precisely obtained without the need to machine shoulder 42 to extremely accurate tolerances. Required changes in the optical path distance of the copier may also be accomplished by inserting shims (not shown) between shoulders 42 and the abutting side edge 58 of prism holder 26, or by adjustably mounting lens holder 34 in a threaded opening (not shown) defined in supporting bracket 48.

With the subject arrangement automatic adjustment of the optical path length of a photographic copier may be accomplished to compensate for variations in the focal lengths of lenses, for example, variations from nominal due to manufacturing tolerances. Lenses may be interchanged in such a copier arrangement without the need to recalibrate the synchronized speed of travel of the film conveyor with respect to the speed of the document conveyor. This is done by simply measuring the actual focal length of the lens to determine its variation from nominal and machining a lens holder 34 which will vary the nominal optical path length to provide the desired reduction ratio, as has been previously described. The lens is then mounted in the lens holder which is inserted into supporting bracket 48 and secured in place by means of set screw 52. Shoulder 42 automatically abuts the adjacent side edge 58 of slidable prism holder 26, moving the holder 26 to the right against the bias of spring 56 to automatically position prism 20 to obtain and maintain the desired reduction ratio precisely.

As changes can be made in the above described construction and many apparently different embodiments of this invention can be made without departing from the scope thereof, it is intended that all matter contained in the above description or shown on the accompanying drawing be interpreted as illustrative only and not in a limiting sense.

What is claimed is:

1. In a machine for producing photographic copies of documents, mechanism for providing a precise reduction in the size of said document copies relative to the actual size of the documents photographed, said machine including a document conveyor for transporting documents to be copied at a first certain speed past an illuminated photograph zone lying in an object plane and a film transport for transporting film past a certain image projection zone lying in an image plane, said image plane being spaced from said object plane, said film transport conveying said film at a second certain speed in predetermined synchronism with the speed of travel of said document in accordance with a predetermined reduction ratio, a lens, a lens holder encasing said lens, means removably securing said lens holder at a certain distance from said image plane and with the optical axis of said lens in alignment with said projection zone, said lens holder having a shoulder portion positioned at a predetermined point along the optical axis of said lens, light deflecting means interposed along the optical axis of said lens and positioned for receiving the images of documents passing through said photograph zone, said deflecting means providing a folded optical path and directing said document images from said photograph zone through said lens onto said film moving past said image projection zone, means mounting said deflecting means against movement transverse to the optical axis of said lens and allowing movement thereof along said optical axis, said mounting means including a portion formed for abutting relationship with said lens holder shoulder, and means yieldably urging said abutting portion against said shoulder to establish the position of said deflecting means carried by said mounting means with respect to said lens.

2. In a machine as set forth in claim 1 wherein said light deflecting means is a prism.

3. In a machine as set forth in claim 1 wherein is also provided inclined mirror means interposed in the optical path extending from said photograph zone for directing the document image projected along said path along a folded optical path to said light deflecting means.

4. In a machine as set forth in claim 1 wherein said means removably securing said lens holder is in the form of a base plate having a groove extending in alignment and parallel to the optical axis of said lens when said lens is secured in said lens holder, and wherein said mounting means for said deflecting means includes a plate member disposed in said groove of said base plate for longitudinal movement along the optical axis of said lens, said plate member having a side edge positioned for abutting relationship with said shoulder portion of said lens holder, and wherein said urging means includes a spring under tension biasing said plate member towards said lens holder, urging said side edge into abutting relationship with said shoulder to precisely position said deflecting means to provide a predetermined optical path length in accordance with the point along said optical axis at which said shoulder portion is predeterminedly positioned, said predetermined position of said shoulder portion being determined by the measured focal length of said lens to provide a predetermined calculated optical path length between said fixed image and object planes.

No references cited.

NORTON ANSHER, *Primary Examiner.*